United States Patent [19]

Kawagoe et al.

[11] Patent Number: 5,781,263
[45] Date of Patent: Jul. 14, 1998

[54] LIQUID CRYSTAL DISPLAY DEVICE WHEREIN DRIVING FREQUENCY IS 200 OR LESS AND 50% THRESHOLD VOLTAGE IS 1.5 V OR LESS

[75] Inventors: Jun Kawagoe, Tokyo; Satoru Ihara, Amagasaki; Hitoshi Ooaku, Chigasaki, all of Japan

[73] Assignee: Optrex Corporation, Tokyo, Japan

[21] Appl. No.: 816,895

[22] Filed: Mar. 13, 1997

[30] Foreign Application Priority Data

Mar. 14, 1996 [JP] Japan .................................. 8-057954

[51] Int. Cl.$^6$ .................. G02F 1/141; G02F 1/1337; C09K 19/02; G09G 3/36
[52] U.S. Cl. .................... 349/135; 349/179; 349/123; 345/96
[58] Field of Search ...................... 349/135, 123, 349/179, 180, 33; 345/96

[56] References Cited

U.S. PATENT DOCUMENTS

| | | | |
|---|---|---|---|
| Re. 34,885 | 3/1995 | Yokokura et al. | 349/136 |
| 4,781,439 | 11/1988 | Yokokura et al. | 349/136 |
| 4,856,875 | 8/1989 | Kozaki et al. | 349/179 |
| 4,864,008 | 9/1989 | Murata et al. | 349/136 |
| 4,909,605 | 3/1990 | Asano et al. | 349/136 |
| 4,944,577 | 7/1990 | Yoshida et al. | 349/179 |
| 4,974,940 | 12/1990 | Asano et al. | 349/136 |
| 4,984,874 | 1/1991 | Yamamoto et al. | 439/136 |
| 5,124,825 | 6/1992 | Asano et al. | 349/179 |
| 5,174,920 | 12/1992 | Iijima | 349/179 |
| 5,215,677 | 6/1993 | Narita et al. | 349/136 |
| 5,229,031 | 7/1993 | Iijima | 349/179 |
| 5,288,427 | 2/1994 | Weber et al. | 349/179 |
| 5,453,863 | 9/1995 | West et al. | 349/180 |
| 5,648,829 | 7/1997 | Yano | 349/136 |
| 5,705,096 | 1/1998 | Kano et al. | 349/123 |

Primary Examiner—Anita Pellman Gross
Assistant Examiner—Tarifur R. Chowdhury
Attorney, Agent, or Firm—Oblon, Spivak, McClelland, Maier & Neustadt, P.C.

[57] ABSTRACT

A liquid crystal display device permitting low voltage driving which presents good display quality for a long time and excellent characteristics in low power consumption when voltage is supplied at a high temperature of about 50° C. under a driving condition of a low frequency of 200 or less in terms of the number of polarity inversion per second. The display device includes a liquid crystal composition in which the voltage corresponding to 50% threshold value is 1.5 V or less is selected, and a fluorine-containing polymer material such as a fluorine-containing polyimide is used.

7 Claims, 1 Drawing Sheet

LIQUID CRYSTAL DISPLAY DEVICE WHEREIN DRIVING FREQUENCY IS 200 OR LESS AND 50% THRESHOLD VOLTAGE IS 1.5 V OR LESS

BACKGROUND OF THE INVENTION

1. Field of the Invention

The present invention relates to a liquid crystal display device permitting low voltage driving.

2. Discussion of Background

In the application of handy information terminals, handy phones or the like, there has been a demand for a liquid crystal display device (hereinbelow, referred to as LCD) of smaller power consumption from viewpoints of reducing the weight and elongation of battery life. The power consumption of LCD is nearly proportional to a frequency of applied electric field and to squared applied voltage. Therefore, proposal of LCD permitting low voltage driving and assuring an excellent display, even when it is driven with a low frequency, is expected.

In order to reduce the driving voltage for LCD, it is effective to use a liquid crystal composition having a low threshold voltage as material for constituting the liquid crystal layer, and it is known that the threshold voltage decreases as the dielectric anisotropy of the liquid crystal composition is larger. However, the conventional LCD had the following problem. When a liquid crystal composition having a larger dielectric anisotropy which is effective to reduce the threshold voltage, was used for merely reducing driving voltage and LCD was driven with a low frequency of 200 or less in terms of the number of polarity inversion per second, an ununiform display took place in several to several ten hours by the supply of electric voltage at a high temperature of about 50° C. with the result that it was not suitable for practical use.

SUMMARY OF THE INVENTION

It is an object of the present invention to provide a liquid crystal display device permitting low frequency driving and preventing occurrence of an ununiform display even when a driving voltage is supplied for a long time at a high temperature under a condition of low frequency driving.

The inventors of this application have considered that the above-mentioned ununiform display by supplying a voltage under a high temperature condition is caused by a low resistivity due to ionic impurities, which is found commonly in liquid crystal compositions having a larger dielectric anisotropy. They have examined to increase the value of resistivity, however, they failed to solve the problem.

They have changed the viewpoint of study and have studied in attention to a relation of the ununiform display to the characteristics of an aligning layer. As a result, they have found that in a large-sized full-dot type display device for which effort of obtaining a high contrast has conventionally been made by utilizing a nature of high pretilt, the problem of ununiform display can be solved by using an aligning layer composed of a fluorine-containing material, to which high frequency driving of, for example, 500 or more in terms of the number of polarity inversion per second was inclusively applied, even when it is used in combination of the liquid crystal composition having a large dielectric anisotropy. Thus, they have achieved the present invention.

In accordance with the first aspect of the invention, there is provided a liquid crystal display device comprising a nematic liquid crystal composition of positive dielectric anisotropy sealed between two substrates each provided with a transparent electrode and an aligning layer formed on the electrode, and a polarizer disposed outside of at least one of the substrates, wherein the crossing angle formed between the directions of alignment in the aligning layers is 80°–300° and a low frequency of 200 or less in terms of the number of polarity inversion per second is applied for driving, the liquid crystal display device being characterized in that the value of a voltage corresponding to 50% threshold value is 1.5 V or less, and the aligning layers are composed of a fluorine-containing polymer material.

In accordance with the second aspect of the invention, there is provided a liquid crystal display device according to the first aspect of the invention, wherein the polarizer is provided outside of each substrate.

In accordance with the third aspect of the invention, there is provided a liquid crystal display device according to the first aspect of the invention, wherein the fluorine-containing form in the polymer material is at least one form selected from the group consisting of a bistrifluoromethylmethylene form and a form in which all hydrogen atoms except for the connecting sites of aromatic rings are substituted by fluorine atoms.

In accordance with the fourth aspect of the invention, there is provided a liquid crystal display device according to the first aspect of the invention, wherein the fluorine content in the polymer material is from 5 to 70 fluorine atoms per 100 carbon atoms.

In accordance with the fifth aspect of the invention, there is provided a liquid crystal display device according to the first aspect of the invention, wherein the dielectric anisotropy of the liquid crystal composition is +19 or more.

In accordance with the sixth aspect of the invention, there is provided a liquid crystal display device according to the second aspect of the invention, wherein a retardation film or an interference liquid crystal layer which has an optically compensating function is disposed at least one of spaces formed between the substrates and the polarizers provided at both sides of the substrates.

In the present invention, it is important to use an aligning layer composed of a fluorine-containing polymer material. Although the structure of the fluorine-containing polymer material is not in particular limited, the polymer material should contain 5–70 fluorine atoms, particularly, 10–30 fluorine atoms per 100 carbon atoms from the viewpoint of the resistivity of the aligning layer. Further, the polymer material having a polyimide structure is preferably used from the viewpoints of heat resistance properties of the layer, resistance to the liquid crystal, easy film formation and so on.

The fluorine-containing form in the polymer material may, for example, be a form of a connecting group such as a perfluoroalkylene group, an oxyperfluoroalkylene group, a perfluoroarylene group or an oxyperfluoroarylene group, or a form of a substituent such as a fluorine atom, a perfluoroalkyl group, a perfluoroalkoxy group, a perfluoroaryl group or an oxyperfluoroaryl group. From the viewpoint of e.g. availability and stability of the film, it is preferred to employ a bistrifluoromethylmethylene form or a form in which all hydrogen atoms except for the connecting sites of aromatic rings are substituted by fluorine atoms.

The resistivity (25° C.) of the aligning layer composed of the above-mentioned fluorine-containing polymer material is generally $1\times10^{12}$ Ωcm or less. The thickness of the aligning layer is not in particular specified. However, when it is too thin, failure of alignment occurs. On the other hand, when it is too thick, there is possibility of reduction in contrast. Accordingly, it is preferred to select the thickness from a range of 20 nm–80 nm.

In the present invention, the voltage corresponding to 50% threshold value means a voltage wherein a value of the transmittance is an average value between the maximum value and the minimum value when the liquid crystal display device is subjected to static driving. Further, it is important that the voltage is 1.5 V or less.

In order to reduce the threshold voltage, use of a liquid crystal composition having a larger dielectric anisotropy is generally effective. For example, a liquid crystal composition having a dielectric anisotropy of +19 or more is preferably used. As a typical example, there is a composition containing a fluorocyanophenylester type liquid crystal material.

The resistivity (25°C.) of such liquid crystal composition after sealing is generally $7 \times 10^{10}$ $\Omega$cm or less. In the present invention, the twist angle of liquid crystal molecules between the electrodes is 80°–300°, preferably, 160°–270°. When it is too small, a change of state of the liquid crystal in multiplexing drive is small. On the other hand, when it is too large, hysteresis or domains wherein light is scattered easily takes place.

The whole structure of the liquid crystal display device of the present invention will be described.

A transparent electrode such as ITO ($In_2O_3$—$SnO_2$), $SnO_2$ or the like is formed on a front surface of each of substrates such as plastic, glass or the like, and each of the transparent electrodes is patterned to have a predetermined pattern. A film composed of a fluorine-containing polymer material is formed on the front surface of each of the substrates. The front surface of the film is subjected to rubbing or the like to thereby conduct an aligning treatment. Between the substrates with transparent electrodes on which aligning layers are formed, a liquid crystal layer including a nematic liquid crystal of positive dielectric anisotropy wherein the twist angle of the liquid crystal is 80°–300°, is interposed.

The display device can be used as a transparent type in which a back light is used, as a reflection type in which a reflector is used, or as a semi-transparent type in which a semi-transparent reflector is used. Further, the display device can also be used as a color display device in which a color filter layer is formed on either of the substrates.

In a liquid crystal display device in which a retardation film or a interference liquid crystal layer which has an optically compensating function is disposed at at least one space in spaces between the substrates and the polarizers disposed at both sides of the substrates, it exhibits a large contrast in comparison with a display device without having such retardation film or interference liquid crystal layer, with the result that ununiformity of display is apt to become conspicuous. Accordingly, when such display device is provided with the structure of the present invention, effect is further remarkable.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In the following, preferred embodiments of the present invention will be described with reference to the drawings.

Figure 1:
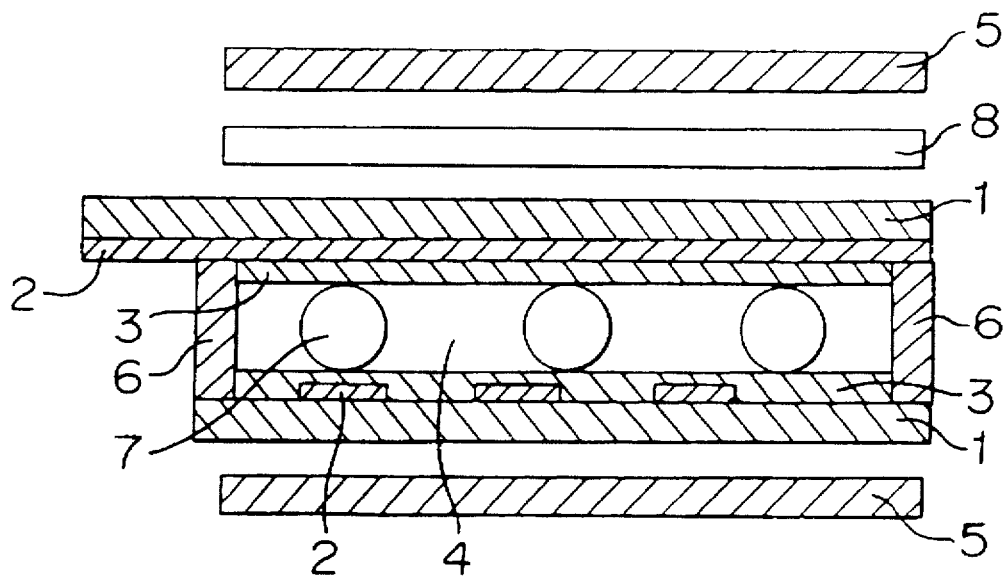
FIG. 1 is a cross-sectional view of an embodiment of the present invention which is applied to a transparent type liquid crystal display device.

FIG. 1 shows an embodiment of the present invention which is applied to a transparent type liquid crystal display device wherein a back light, a light guide plate and so on which are disposed below a lower substrate are omitted. In FIG. 1, reference numeral 1, 1 designate a pair of substrates made of material such as plastics, glass or the like, numeral 2, 2 designate transparent electrodes formed on each of the substrates 1, numeral 3, 3 designate aligning layers formed on the transparent electrodes 2, numeral 4 designates a liquid crystal composition interposed between the substrates by interposing spacers 7. The liquid crystal composition 4 is sealed by means of the substrates 1 and sealing members 6. Numeral 5, 5 designate polarizers disposed outside of the substrates 1, and numeral 8 designates a retardation film interposed between one of the substrates 1 and the polarizing plate 5 disposed at an upper part of the substrate 1.

The retardation film 8 may be replaced by an interference liquid crystal layer, or may be omitted. Further, two retardation films 8 may be used so that they are interposed respectively between the substrates and the polarizers.

Figure 2:
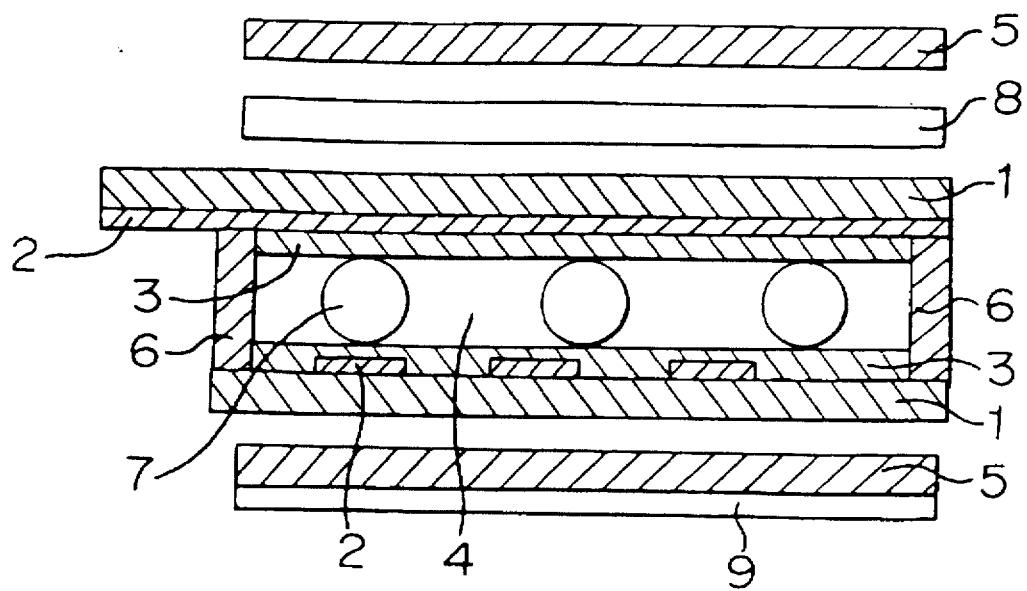
FIG. 2 is a cross-sectional view of another embodiment of the present invention which is applied to a reflection type liquid crystal display device.

FIG. 2 shows an embodiment of the present invention applied to a reflection type liquid crystal display device wherein the same reference numerals as in FIG. 1 designate the same or corresponding parts, and description of these part is omitted. In these cases, also, various modifications are possible in the same manner as in the embodiment shown in FIG. 1.

The liquid crystal display device of the present invention is driven with a low frequency of 200 or less in terms of the number of polarity inversion per second. From the viewpoint of reducing power consumption, a driving method wherein polarities are inversed for each frame so that the number of polarity inversion per second is about 50–100 is preferably employed. When the liquid crystal display device is driven with a high frequency of, for example, 500 or more, reduction of power consumption can not be achieved even when the voltage corresponding to 50% threshold value is 1.5 V or less and there causes no problem of ununiformity of voltage application.

Further, the liquid crystal display device of the present invention is preferably applied to a case that it is driven at a duty ratio of about ⅛–1/65.

The liquid crystal display device of the present invention can be utilized for, for instance, a fish finder, an instrumental panel for automobile, an information terminal, an information displaying device for industrial use (for instance, to display an operation mode in the operation panel of a copy machine or to display an operation mode for a power machine), a dot matrix display device for consumer use (e.g., an audio device, a watch, a game device, an amusement device, a telecommunication device, a navigator for automobile, a camera, a telephone with TV, an electronic calculator).

In particular, the liquid crystal display device of the present invention can be used with a low driving voltage at a reduced power consumption rate. Accordingly, when it is used for a handy electronic device such as a handy phone, an electronic diary, an electronic book, an electronic dictionary, a PDA (a handy data accessing terminal), a pager (pocket bell) or the like, it operates effectively. Further, the present invention can be applied to various purposes of use as far as the effect of the present invention is not reduced.

Now, the present invention will be described in detail with reference to Examples. However, it should be understood that the present invention is not means restricted by such specific Examples.

EXAMPLE 1

A transparent electric conductive film of a surface resistance of about 100 Ω/□ was formed on a surface of two glass substrates, and an electrode pattern was formed in a stripe form on the transparent electric conductive film by a photolithography method. On the electrode pattern, an insulating layer composed of silica and titania was formed at a thickness of about 50 nm, and further, an aligning layer of 40 nm thick was formed by coating a predetermined material for aligning layer by a printing method followed by baking. An aligning treatment was conducted to a surface of the aligning layer by a rubbing method. The direction of aligning was so determined that the crossing angle was 240° when the cell was assembled. A sealing material made of a thermosettable epoxy resin was screen-printed on one of a set of upper and lower substrates to have a predetermined shape, and plastic beads as spacers were scattered on the other substrate in order to keep the cell gap between the substrates to be constant. Then, the upper and lower substrates were overlaid at predetermined positions, and heat-pressing was applied to them for bonding. The spacers were so selected that the cell gap was 6 μm when assembling was carried out to form an empty cell. Into the thus formed empty cell, a predetermined liquid crystal composition was injected by a vacuum injection method, and the liquid crystal composition was sealed therein by using an epoxy resin.

The display device prepared as described above was subjected to evaluation, and voltage application tests were conducted at 50° C. under conditions that combination of the sealed liquid crystal composition and the aligning layer material was changed and the display device was driven at a duty ratio of 1/32, a bias of 1/7 and a number of polarity inversion per second of 70 (polarity inversion for each frame).

EXAMPLE 1

When a liquid crystal composition having a dielectric anisotropy of +22 and a birefringence of 0.147 was combined with a fluorine-containing polyimide type aligning layer material made of an equimolar polycondensate of pyromellitic dianhydride and 4",4'"-(hexafluoroisopropylidene)bis(4-phenoxyaniline) and having a fluorine content (i.e. the number of fluorine atoms per 100 carbon atoms) of 16.2, in which the fluorine-containing form is bistrifluoromethylmethylene, no formation of ununiform display was observed during continuous voltage application for 200 hours, and a uniform display was maintained. The voltage corresponding to 50% threshold value at this moment was 1.39 V.

EXAMPLE 2

Also when the same liquid crystal composition as used in Example 1 was combined with a perfluoropolyimide type aligning layer material made of an equimolar polycondensate of 1,4-bis(3,4-dicarboxytrifluorophenoxy) tetrafluorobenzene dianhydride and bis(2,3,5,6tetrafluoro-4-aminophenyl)-ether and having a fluorine content (same as above) of 53, in which the fluorine-containing form was a form wherein all hydrogen atoms except for the connecting sites of aromatic rings were substituted by fluorine atoms, no formation of ununiform display was observed during continuous voltage application for 200 hours, and a uniform display was maintained. The voltage corresponding to 50% threshold value at this moment was 1.37 V.

EXAMPLE 3 (COMPARATIVE EXAMPLE)

When the same liquid crystal composition as used in Example 1 was combined with an ordinary polyimide type aligning layer material without having a fluorine content, ununiform display took place 4 hours after the starting of voltage application. The voltage corresponding to 50% threshold value at this moment was 1.45 V.

EXAMPLE 4 (COMPARATIVE EXAMPLE)

When a liquid crystal composition having a dielectric anisotropy of +10 and a birefringence of 0.146 was combined with the same aligning layer material as used in Example 1, ununiform display became remarkable 48 hours after the starting of voltage application. The voltage corresponding to 50% threshold value at this moment was 2.06 V.

EXAMPLE 5 (COMPARATIVE EXAMPLE)

When the same liquid crystal composition as used in Example 4 was combined with the same aligning layer material as used in Example 3, no ununiform display was observed even after continuous voltage application of 200 hours, and a uniform display was maintained. The voltage corresponding to 50% threshold value at this moment was 2.14 V.

The liquid crystal display device of the present invention can be driven with a low voltage and can maintain a uniform display by supplying the voltage for a long time at a high temperature of about 50° C. under a driving condition of a low frequency of 200 or less in terms of the number of polarity inversion per second. Further, the liquid crystal display device exhibits excellent performance of low power consumption, and it is in particular useful as a display device for a handy electronic device.

Obviously, numerous modifications and variations of the present invention are possible in light of the above teachings. It is therefore to be understood that within the scope of the appended claims, the invention may be practiced otherwise than as specifically described herein.

What is claimed is:

1. A liquid crystal display device comprising a nematic liquid crystal composition of positive dielectric anisotropy sealed between two substrates each provided with a transparent electrode and an aligning layer formed on the electrode, and a polarizer disposed outside of at least one of the substrates, wherein the crossing angle formed between the directions of alignment in the aligning layers is 80°–300° and a low frequency of 200 or less in terms of the number of polarity inversion per second is applied for driving, the liquid crystal display device being characterized in that the value of a voltage corresponding to 50% threshold value is 1.5 V or less, and the aligning layers are composed of a fluorine-containing polymer material.

2. The liquid crystal display device according to claim 1, wherein the polarizer is provided outside of each substrate.

3. The liquid crystal display device according to claim 1, wherein the fluorine-containing form in the polymer material is at least one form selected from the group consisting of a bistrifluoromethylmethylene form and a form in which all hydrogen atoms except for the connecting sites of aromatic rings are substituted by fluorine atoms.

4. The liquid crystal display device according to claim 1, wherein the fluorine content in the polymer material is from 5 to 70 fluorine atoms per 100 carbon atoms.

5. The liquid crystal display device according to claim 1, wherein the dielectric anisotropy of the liquid crystal composition is +19 or more.

6. The liquid crystal display device according to claim 2, wherein a retardation film or an interference liquid crystal layer which has an optically compensating function is disposed at least one of spaces formed between the substrates and the polarizers provided at both sides of the substrates.

7. The liquid crystal display device according to claim 1, wherein the crossing angle formed between the directions of alignment is 160°–270°, and the liquid crystal composition includes a chiral material.

* * * * *